United States Patent Office
3,179,621
Patented Apr. 20, 1965

3,179,621
POLYOLEFINS STABILIZED WITH A TRIALKYL TRITHIOPHOSPHITE AND A DIALKYLAMINE OF A GROUP II METAL CHALCOGENIDE
Bernard Wright, Eccles, near Manchester, and George R. Williamson, Davyhulme, near Manchester, England, assignors to Shell Oil Company, New York, N.Y., a corporation of Delaware
No Drawing. Filed Nov. 13, 1962, Ser. No. 237,341
Claims priority, application Great Britain, Nov. 17, 1961, 41,228/61
6 Claims. (Cl. 260—45.75)

This invention relates to stabilized hydrocarbon polymers. More particularly, it relates to the stabilization of low pressure polymers of alpha-monoolefins, such as Ziegler type polyethylene, against deterioration resulting from exposure to heat and light. Stabilization is accomplished with a novel combination of stabilizers.

Polyolefins such as polyethylene, in common with most synthetic polymers, may undergo degradation and discoloration in use. This may occur as a result of exposure to light, or as a result of processing, e.g., milling or other working at elevated temperatures, i.e., above 100° C. A number of compounds have been proposed as additives for inhibiting oxidation of photo-degradation of hydrocarbon polymers which have been heretofore commercially used. Many of these additives are not desirable for use with low pressure poly-alpha olefins, for various reasons; for example, they may result in undesirable side effects, such as substantial decoloration of the polymer, even while they serve to inhibit oxidation.

Much effort has been devoted to the problem of finding satisfactory stabilizers to protect polyolefins from the effects of heat and light.

Many kinds of additives have been proposed hitherto for use in hydrocarbon polymers but there is still a need in the art for an effective stabilizer system for hydrocarbon polymers, that is to say, one or more additives which alone or in combination can be added to hydrocarbon polymers, particularly Ziegler polyethylene, to confer both light and heat stability under certain of the more severe conditions of processing and subsequent consumer usage to which such hydrocarbon polymers may be subjected.

Surprisingly, it has now been found that good thermal and light stabilization can be obtained by the use in hydrocarbon polymers of (a) certain organic compounds containing both sulfur and phosphorus in their molecular structures in combination with (b) certain organic or inorganic bases, and that this combination is substantially free of objectionable odor during processing. It has been found, for example, that organic thiophosphites are better thermal stabilizers than the corresponding organic phosphites and that surprisingly the organic thiophosphites appear to give rise to less odor during thermal processing, e.g., molding, of polymers containing them than do the corresponding organic phosphites. Also, the improvement in the stabilizing effect of an organic trithiophosphite when it is present together with a base in the polymer composition, as compared with the stabilizing effect of the organic trithiophosphite stabilizer when used alone, or even when used in combination with a phenolic antioxidant but in the absence of base, indicates that synergism arises when organic trithiophosphites and bases are used in combination. The present invention is not, however, limited to the use of organic trithiophosphites but also includes the use, in combination with a base, or organic mono- and di-thiophosphites or of organic thiophosphates, including those containing either sulfur or both sulfur and oxygen in the molecule.

Accordingly, the present invention provides a polymer composition which comprises a major weight proportion of a hydrocarbon polymer such, for example, as a polyolefin and a minor weight proportion of additives comprising (a) an organic compound of the formula:

(1)
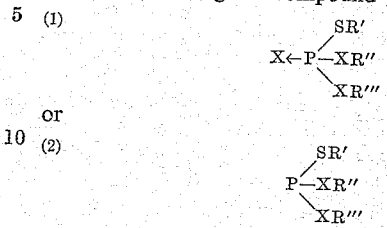

or (2)

$$P\begin{smallmatrix}SR'\\-XR''\\XR'''\end{smallmatrix}$$

in which R', R" and R''' represent the same or different hydrocarbon radicals, which radicals can be substituted or not, S represents a sulfur atom, and X represents either a sulfur atom or an oxygen atom; and (b) a base which is either an aliphatic amine or an oxide, hydroxide, carbonate, sulfide or a salt of a metal of Group I or II of the Periodic Classification and a weak acid. Combinations of certain preferred compounds of the two types provide particularly outstanding and unusually useful protection of low pressure polyethylene against thermal degradation and deterioration due to ultraviolet radiation.

The organic phosphorus- and sulfur-containing organic compounds which can be used in carrying out the present invention include those in which the hydrocarbon radicals R', and R" and R''', are aliphatic, aryl-substituted aliphatic, cycloaliphatic, aromatic or alkyl-substituted aromatic radicals; such radicals can, if desired, contain substituent atoms or groups, e.g., halogen atoms and hydroxyl, alkoxy, aryloxy, acyl, aroyl, carboxyl and ester groups, which do not adversely affect the hydrocarbon polymer or interfere with or materially reduce the stabilizing properties of the thiophosphite. Usually each radical R', R" and R" will be the same and preferably an alkyl radical or a monoalkyl-substituted phenyl radical, the alkyl radical or the alkyl substituent of the phenyl radical preferably containing at least six carbon atoms, in particular from six to twenty and advantageously eight to fifteen carbon atoms. Preferably a trithiophosphite is used, as for example, trilauryl trithiophosphite or trinonylphenyl trithiophosphite. Other suitable trithiophosphites are trioctyl trithiophosphites; trihexylphenyl trithiophosphite; tridecyl trithiophosphite; tribenzyl trithiophosphite; tristearyl trithiophosphite; tridecylphenyl trithiophosphite; tribenzoylphenyl trithiophosphite; tricyclohexyl trithiophosphite; tripalmityl trithiophosphite; tri(hydroxyphenyl) trithiophosphite; tri(methoxyphenyl) trithiophosphite; trichlorolauryl trithiophosphite; tri(dihydroxyphenyl) trithiophosphite; tri(diethoxyphenyl) trithiophosphite; trinaphthyl trithiophosphite and tri(carboxyphenyl) trithiophosphite.

As previously indicated the present invention is not limited to the use of organic thiophosphites, although the trithiophosphites are at present preferred, and it is also possible to use, in addition to thiophosphites containing only one or two sulfur atoms in the molecule, such phosphorus- and sulfur-containing organic compounds as the compounds:

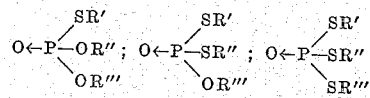

and the corresponding compounds containing the

structure.

The other essential component of the polymer compositions of the present invention is a basic compound, selected from the group consisting of aliphatic amines and inorganic basic compound as defined above. The alkyl groups of suitable aliphatic amines preferably contain at least six carbon atoms each, in particular from six to twenty and advantageously eight to fifteen carbon atoms. The primary, secondary, and tertiary alkylamines can be used; secondary alkylamines are preferred. Mono-, di-, and tri-alkanolamines may also be used. When an aliphatic amine is used this should not be volatile to the extent of rendering it difficult to incorporate the additive in the hydrocarbon polymer at an elevated temperature, e.g., by hot milling, or making it impossible to retain an adequate amount of additive in the polymer during processing, e.g., molding or extrusion, at elevated temperatures. Examples of suitable amines are di-hexylamine, tri-hexylamine; di-n-decylamine, di-n-dodecylamine; di-n-octadecylamine; di-isopropanolamine; and tri-isopropanolamine.

The inorganic basic compounds which can be used include the Group I metal carbonates and sulfides, e.g., sodium carbonate or sodium sulfide, and the Group II metal oxides, hydroxides, carbonates and sulfides, e.g., calcium oxide, barium oxide, cadmium oxide, magnesium oxide, calcium carbonate, calcium hydroxide, zinc sulfide, zinc oxide, cadmium sulfide, the basic zinc salts and also Group I or II metal salts of weak acids, e.g., of the aliphatic monocarboxylic acids. Particularly suitable are salts of metals of Group II of the Periodic Classification with chalcogen elements. Especially preferred are the chalcogenides, such as the oxides and sulfides of zinc, barium, and calcium, particularly zinc oxide, calcium oxide, and zinc sulfide.

Especially preferred combinations according to this invention comprise trilauryl thiophosphite as the sulfur- and phosphorus-containing compound and zinc oxide or di-n-decylamine as the basic compound.

In some cases it may be advantageous to use in polymers stabilized with a combination of stabilizers containing the above described synergistic combination at least a third component which is a metal salt of an organic acid in which the metal is selected from Groups I to IV and preferably from Group II of the Periodic Table and the acid is preferably a long chain fatty acid. The metal salts of organic acids assist in reducing the corrosivity of the polyolefin compositions to molds and other surfaces with which the hot polymer comes in contact. As metal salts of organic acids which may be used as further additives, it is preferred to use salts of long chain fatty acids and metals of Groups I to IV of the Periodic Table. Particularly suitable are, for example, the stearates, oleates and ricinoleates of lithium, calcium, strontium, barium, magnesium, zinc, cadmium, aluminum, tin, lead, and bismuth. Of these, the calcium, lithium, barium, cadmium, and lead salts are preferred, the calcium salts being particularly preferred. One of the special advantages of the calcium salts is that they are non-toxic. Calcium stearate in particular is applicable for general use in Ziegler polyethylene and polypropylene together with the stabilizer combination of the present invention. Suitable salts are those of fatty acids having at least 6, preferably at least 8 or 10, and generally up to 30 carbon atoms per molecule. The presence of other additives in the polymer compositions of the present invention is also possible and in some cases may be desirable. For example, the presence of one of the well known phenolic antioxidants is advantageous in some instances. Other additives which can be present in the compositions of the present invention include stabilizers such as the salicylate or benzophenone type of U.V. stabilizer. Conventional additives such as fillers, pigments, and plasticizers may be present.

The inhibitor combinations of this invention can be used to stabilize a variety of polymer compositions against deterioration resulting from exposure to actinic light. In general, the stabilizable compositions comprise a major proportion of a polyolefin prepared by the so-called low pressure polymerization process, i.e., a process operating at pressures below about 500 atmospheres, using a stereospecific catalyst system. A variety of stereospecific catalysts have been described in the literature. They are generally species or modifications of the so-called Ziegler or Natta catalysts. The resulting polymers are essentially linear in structure. Ziegler polymerization processes are described in U.K. patent specification Nos. 799,392; 799,823; 801,031; and 810,023.

In the production of linear polymers, the reaction mixture formed in the low pressure polymerization is treated to deactivate the catalyst, usually by contact with a polar compound such as an alcohol and/or hydrochloric acid, and is subsequently worked for removal of at least a substantial part of the catalyst residue. The resulting polymer almost invariably contains at least traces of catalyst residue. Typically, it may contain 50 to 500 parts per million (p.p.m.) of each of the catalyst components, calculated as the corresponding metal. A carefully purified polymer may contain as little as 10 p.p.m. of each metal or less. The additives of this invention are effective in polymer containing catalyst residues.

The Ziegler type catalysts may be designated "metal alkyl-reducible metal halide type" and the Natta type catalysts "performed metal subhalide type." This terminology is used, for example, in "Polyolefin Resin Processes" by Marshall Sittig, Gulf Publishing Co., Houston, Texas, 1961. These well known catalysts are the reaction products of halides, in order of preference, chlorides and bromides, of transition metals from subgroups A of Groups IV and V of the Mendeleev Periodic Table, as illustrated on page 28 of Ephraim, "Inorganic Chemistry," Sixth English Edition, i.e., Ti, Zr, Hf, V, Nb, or Ta, with organometallic reducing agents in which the metal is from Groups I, II, or III. Preferred reducing agents are organo-aluminum compounds and particularly aluminum alkyls, including aluminum alkyl halides. Among the effective catalysts are those prepared, for example, (a) by mixing an aluminum trialkyl, e.g., aluminum triethyl or triisobutyl or an aluminum alkyl halide, e.g., aluminum diethyl monochloride, with a Group IVA metal halide, in particular a chloride, e.g., titanium tetrachloride or trichloride; or (b) by mixing an aluminum trialkyl, e.g., aluminum triethyl, with titanium tetrachloride in substantially stoichiometric amounts (which term includes a slight excess, e.g., up to 20% wt. of the aluminum trialkyl) and, after reduction of $TiCl_3$ has taken place, adding an aluminum dialkyl chloride, e.g., aluminum diethyl chloride thereto.

While the present invention is particularly suitable for the inhibition of linear polyethylene it can also be used in the inhibition of other polymers of alpha-olefins, particularly those having from 3 to 10 carbon atoms, including both straight chain and branched terminally unsaturated alkenes, e.g., propylene, butene-1, 4-methylpentene-1, 3-methylbutene-1, 3,3-dimethylbutene-1, pentene-1 and the like, particularly those of 1 to 6 carbon atoms per molecule, and also including copolymers of two or more such olefins, e.g., copolymers of ethylene with propylene or with butene-1. Other hydrocarbon polymers may also be stabilized according to this invention, e.g., high pressure polyethylene and polystyrene.

The additives of this invention are generally each employed in amounts from 0.001 up to about 5% by weight, based on the amount of polymer. In the case of the preferred organic thiophosphites, the amount of thiophosphite is preferably between about 0.05% and 2%, most preferably from about 0.1% to 1%; the amount of base is preferably between about 0.1% and 5%, most preferably from about 0.3 to 1%, by weight of the polymer. Mixtures of one or more of said organic thiophosphites, together with one or more of said bases, can be present in the polymer compositions of the present invention if desired; it will normally be sufficient to use one such organic thiophosphite in combination with one such base.

The weight ratios of the thiophosphite and base type stabilizers are suitably approximately 1:1, but they may vary, for example, in the range from 1:20 to 20:1. Preferred ratios are from 1:10 to 10:1, and more preferably from 1:5 to 2:1.

Any suitable method may be employed for incorporating the additive combination of this invention into olefin polymers. Several such methods are well known. In a particularly suitable method, which is included as part of this invention, a polymer composition comprising a major proportion of a polyolefin, such as Ziegler polyethylene, and a minor proportion of additives of this invention is prepared by dry blending said additives with said polymer, for example in a powder blender, and thereafter mechanically working the resulting dry blend at an elevated temperature, as for example by milling at a temperature above about 100° or by extrusion or by mixing in a Banbury mixer, e.g., at 150–170° C.

The polymer compositions of the present invention can be used generally for the fabrication of plastic material or articles, e.g., by injection molding or melt extrusion. Polyolefin compositions in accordance with the present invention are particularly suitable for making film and filaments.

The effect of ultraviolet light on a hydrocarbon polymer e.g., a Ziegler polyolefin, is to cause degradation which makes the polymer brittle. Brittleness can be measured by a flexing test and the light stabilizing effectiveness of a particular additive can be expressed in terms of the brittleness of the polymer containing the additive as determined by the flexing test. For example, a sample of standard dimensions of the polymer containing the additive (conveniently a strip 0.5 cm. wide, 10 cm. long and 0.060 cm. thick) can be exposed to ultraviolet radiation for a sufficiently long period that breakage occurs on the first flexing. In carrying out this determination, a standard sample of the polymer with the additive is flexed before exposure until breakage occurs and the number of flexes required is noted. Another sample of the polymer with the additive is exposed for a number of hours and then flexed to breakage and the number of flexes required is again noted. This procedure can be repeated for other samples with increasing exposure periods and from the results the number of flexes can be plotted against the number of hours to give a graph from which the exposure period in hours required to degrade the polymer to such an extent that breakage occurs on flexing once can be determined. In some cases it is more convenient to express the light stability of a polymer in terms of time (T hours) and a percentage determined by dividing the number of flexes required for breakage after T hours exposure by the number of flexes required for breaking the unexposed polymer; this method was used to obtain the percentage figures (referred to as "percent flex") in the following specific examples. It will be realized that the period for 0% flex is in fact the exposure period resulting in breakage on flexing once only. Any suitable light radiation can be employed, for example, natural sunlight or an artificial source of ultraviolet light radiation such as that obtained in a Kelvin and Hughes Fadeometer, or in a Xenotest machine, providing that when comparisons are made care is taken to employ the same test method in each case for the sake of consistency. The figures quoted in the following examples were obtained with the aid of a Fadeometer.

The present invention is illustrated by the following example. The abbreviation "phr." has its ordinary significance in the art, namely "parts per hundred resin," i.e., parts of additive per hundred parts of polymer. All parts and percentages are by weight unless otherwise stated. The results shown are illustrative of preferred embodiments and are not to be considered a limitation of this invention.

Example 1

A Ziegler polyethylene is milled at 160° C. with various amounts of additive(s) as indicated in the table below to form a homogeneous blend in each case. The resulting compositions are pressed into sheets and tested for flex life in the manner described above. The results obtained are indicated in the table below in which the abbreviation TLTP signifies trilauryl thiophosphite:

| Additive | Flex Life (hours) | Percent Flex at 900 hours | Percent Flex at 2,000 hours | Odor during milling |
|---|---|---|---|---|
| None | 420 | | | |
| 1 phr. TLTP | 2,400 | 52 | 8 | |
| 1 phr. ZnO | 950 | 4 | 0 | |
| 1 phr. ZnS | 1,200 | | 0 | |
| 1 phr. TLTP<br>1 phr. ZnO | 4,500 | 61 | 40 | Good. |
| 1 phr. TLTP<br>1 phr. ZnS | 1,700 | | | Good. |
| 1 phr. TLTP<br>1 phr. di-n-decylamine | 2,300 | 60 | | Good. |

In comparative tests, in which trinonyl phenyl phosphite is used in 1 phr. concentration with 1 phr. of each of the basic compounds, an objectionable odor is developed during the milling step.

Example 2

An important requirement of a stabilizer for Ziegler polyolefins is the ability to stabilize the polyolefin under the conditions of thermal processing to which it will be subjected during the manufacture of fabricated articles without itself discoloring or "staining" to an extent which gives rise to an article of unacceptable appearance. The tendency to stain is a characteristic of commercial Ziegler polyolefins which does not arise with polymers prepared with the aid of other catalysts, e.g., high-pressure polyethylene, and it is believed to be due to traces of metal compounds in Ziegler polyolefins as currently manufactured resulting from the Ziegler catalyst used. This liability to cause staining with many otherwise suitable stabilizing additives is a real problem in the Ziegler polyolefin art since it precludes the use in Ziegler polyolefins as currently manufactured of many of the stabilizers which could otherwise be used. Much effort has been devoted hitherto to the problem of finding additives which are good stabilizers and which do not cause objectionable staining when used in Ziegler polyolefins.

In this example Ziegler polyethylene is milled at 160° C. with 0.1 phr. of TLTP and 0.1 phr. of ZnO, and the color and melt index (determined by the standard method referred to in BSS 1972/52) of the resulting blends are determined. Milling is then continued at 160° C. for 1 hour in each case and the color and melt index of the blend determined after 30 minutes' milling and also after 1 hour milling. The initial blend is also tested for high temperature color stability by compression molding at 280° C. for 30 minutes.

The results are indicated in the following table. The data for the initial blend are quoted under the sub-heading "0 min." The color rating figures are obtained in a standard reflectivity test, based on a rating of 100 for the transparent or white polymer and 0 for a complete discolored (black) polymer:

| Additive | Melt Index | | | Color rating | | | High temp. color rating |
|---|---|---|---|---|---|---|---|
| | 0 min. | 30 min. | 60 min. | 0 min. | 30 min. | 60 min. | |
| 0.1 phr. TLTP<br>0.5 phr. ZnO | 0.29 | 0.24 | 0.22 | 93 | 92 | 92 | 83 |

It will be appreciated that little degradation (as measured by melt index determination) and discoloration (as measured by color rating) take place during the initial few minutes milling in which the blends are formed since this milling step is carried out for the minimum time necessary to disperse the additives in the polyolefin. The subsequent milling for 1 hour is, however, a much more rigorous test and represents the worse thermal treatment which can be expected to arise when processing Ziegler polyethylene scrap (i.e., the re-use of excess polyethylene from a previous processing e.g., molding operation) into fabricated articles. The blend is found to be very stable under these conditions.

*Example 3*

Example 1 is repeated, with substitution, for TLTP, of trioctyl trithiophosphite and tristearyl trithiophosphite. Similarly good protection of polyethylene is obtained. The odor, on milling, is good.

*Example 4*

Example 1 is repeated with substitution, for ZnO, of CaO and BaO in separate experiments. Similarly good protection of polyethylene is obtained. The odor, on milling, is good.

*Example 5*

Example 1 is repeated with substitution, for di-n-decylamine, of di-n-hexylamine and di-n-octadecylamine in separate exepriments. Similarly good protection of polyethylene is obtained. The odor, on milling, is good.

*Example 6*

An extended flex life is also obtained when low pressure polymers of propylene, 1-butene and 4-methyl-1-pentene are stabilized with the combined inhibitors of this invention as illustrated in Examples 1–5.

The preferred modes of practicing this invention having been described, other modifications within the scope of the invention will be apparent to persons skilled in the art.

We claim as our invention:

1. A polymer composition comprising
   (a) a solid olefin polymer,
   (b) from 0.05 to 2 percent by weight, based on polyolefin, of a trialkyl trithiophosphite in which the alkyl groups have from 6 to 20 carbon atoms, each, and
   (c) from 0.1 to 5 percent by weight, based on polyolefin, of a compound selected from the group consisting of (1) a chalcogenide of a metal of Group II of the Periodic Classification of elements and (2) a dialkylamine in which the alkyl groups have from six to twenty carbon atoms, each, said components (b) and (c) being present in a weight ratio in the range from 1:5 to 2:1.

2. A polymer composition according to claim 1 wherein component (c) is zinc sulfide.

3. A polymer composition according to claim 1 wherein component (c) is calcium oxide.

4. A polymer composition according to claim 1 wherein component (a) is polypropylene and said component (c) is zinc sulfide.

5. A polymer composition comprising
   (a) linear polyethylene,
   (b) from 0.05 to 2 percent by weight, based on polyethylene, of trilauryl trithiophosphite, and
   (c) from 0.1 to 5 percent by weight, based on polyethylene, of zinc oxide, said components (b) and (c) being present in a weight ratio in the range from 1:5 to 2:1.

6. A polymer composition comprising
   (a) linear polyethylene,
   (b) from 0.05 to 2 percent by weight, based on polyethylene, of trilauryl trithiophosphite, and
   (c) from 0.1 to 5 percent by weight, based on polyethylene, of di-n-decylamine, said components (b) and (c) being present in a ratio in the range from 1:5 to 2:1.

References Cited by the Examiner

UNITED STATES PATENTS

| | | | |
|---|---|---|---|
| 2,735,836 | 2/56 | Fanning | 260—45.7 |
| 3,029,224 | 4/62 | Fischer et al. | 260—45.7 |

LEON J. BERCOVITZ, *Primary Examiner.*

JAMES A. SEIDLECK, *Examiner.*